United States Patent [19]

Podalsky et al.

[11] Patent Number: 5,142,975

[45] Date of Patent: Sep. 1, 1992

[54] APPARATUS SUITABLE FOR RAPID SILK-SCREEN PRINTING OF PLASTIC CONTAINERS

[76] Inventors: David J. Podalsky, 12 Osgood Rd., Kensington, N.H. 03833; William M. Lamarre, 119 Water St., Unit 63, Beverly, Mass. 01915; Heinz W. Stemmler, 5 Boutwell St., Wilmington, Mass. 01887

[21] Appl. No.: 618,081

[22] Filed: Nov. 26, 1990

[51] Int. Cl.[5] .................................. B41F 17/22
[52] U.S. Cl. ........................... 101/40.1; 198/468.4; 198/468.6; 101/124; 101/129
[58] Field of Search .............. 198/775, 774.3, 346.2, 198/468.4, 468.6; 414/752; 101/38, 39, 40, 40.1, 35, 124, 126, 129

[56] References Cited

U.S. PATENT DOCUMENTS

| | | | |
|---|---|---|---|
| 3,159,100 | 12/1964 | Marquiss | 101/40 |
| 3,249,045 | 5/1966 | Karlyn | 101/124 X |
| 3,533,353 | 10/1970 | Dubuit | 101/40 |
| 3,754,667 | 8/1973 | Storch | 214/1 BB |
| 3,757,961 | 9/1973 | Jacobs | 214/1 BB |
| 4,048,914 | 9/1977 | Kammann et al. | 101/35 |
| 4,091,726 | 5/1978 | Walker | 101/40.1 |
| 4,398,627 | 8/1983 | Saccani | 198/339 |
| 4,411,191 | 10/1983 | Combeau | 101/40.1 |
| 4,567,822 | 2/1986 | Heidenreich et al. | 101/38 A |

Primary Examiner—Clifford D. Crowder
Attorney, Agent, or Firm—Herbert L. Gatewood

[57] ABSTRACT

Apparatus for the transfer of ware in step-wise fashion from one point to another with silk-screen printing of the ware between the remote points. The articles of ware, in spaced-apart locations, are moved by an elongated horizontally disposed beam having a plurality of spaced-apart wareholders from a rearward horizontally disposed rest position downwardly in an arcuate path and then upwardly to a second forwardly located rest position in the same horizontal plane. The articles of ware are then each clamped while the beam reverses direction. A further article of ware is placed in the first wareholder, the other forwardly located articles being received in respective forwardly located wareholders. The beam then again moves forward and the articles of ware are each clamped. The beam then reverses direction, receiving a further article, etc. At the print station the articles are each raised vertically upwardly in a smooth curve, printed, and then lowered vertically downwardly in an opposing smooth curve. The printed articles are then forwarded downstream to other work stations.

16 Claims, 9 Drawing Sheets

APPARATUS SUITABLE FOR RAPID SILK-SCREEN PRINTING OF PLASTIC CONTAINERS

BACKGROUND OF THE INVENTION

(1) Field of the Invention

This invention relates, in general, to a method and apparatus for article transfer from one point to another. More particularly, the invention relates to transport apparatus which has particular utility in combination with silk screen printing apparatus for the silk-screen printing of designs on various articles or ware in a continuous, automatic, stepwise fashion. Even more particularly, it relates to apparatus means, and a method, for rapidly transporting ware such as plastic containers or bottles automatically in stepwise fashion and presenting such to a printer head on a silk-screen printer whereat the ware is printed, and afterwards transporting such ware to a curing station and further downstream.

(2) Description of the Prior Art

The silk-screen printing of various ware such as plastic bottles or containers has been practiced now for several years. In general, such a process involves the continuous transporting of ware, spaced-apart a predetermined distance from one another along a horizontal path. The ware is continuously fed, in step-wise fashion, by a conveyor-like device, through various zones. Initially, it passes through a pre-treatment zone whereat that portion of the ware to be printed is conditioned, e.g., by treatment with a flame. Earlier, prior to the flame treatment, the ware may be passed through a zone whereat the ware is subjected to air treatment to remove any dust particles or other foreign particles from the surface to be printed. Following the flame treatment, the ware passes to a printing zone. At that location, the ware is individually printed with a predetermined design and in a predetermined location, as desired.

An early chain indexing system designed to carry plastic containers in stepwise fashion through various work stations on a screen printing apparatus is disclosed in U.S. Pat. No. 3,315,780. That patent issued on Apr. 25, 1967, and was assigned to the assignee of the present invention.

On all automatic and semi-automatic silk-screen printers, the ware must be lifted up to the screen for printing. This is generally to allow the silk-screen motion, which is back and forth in a horizontal plane, to avoid the ware transporting and supporting hardware. The ware, each piece spaced apart equidistant from one another, travels along a horizontal plane parallel to that of the silk screen motion in a lengthwise direction just below the printing head. The mechanism for lifting each piece of the ware, in stepwise fashion, to the print station generally involves independently driven means for both the lifting of the ware up to the print station and removal of the ware therefrom, back down to the plane of travel. This interrupted motion naturally hinders the production efficiency and, as a result, neither the printer nor the transport system can operate to full potential. Thus, for some years now, this problem has been of concern.

At the speeds of operation desired and which automatic machinery is capable of handling (70 pieces per minute and higher), this usually requires cam actuation. It is desirable to limit the number of cams in operating devices, however, as one or two additional cams in an overall apparatus increases the number of support bearings, interconnecting linkages, etc., and reduces reliability accordingly.

One attempt at addressing the problem is disclosed in U.S. Pat. No. 4,398,627, which issued on Aug. 16, 1983. That patent discloses, according to the patentee, a high productivity device for feeding cylindrical objects to silk screen printing machines. In general, the device comprises, in combination, a transport means and means operatively connected thereto for presenting an object to be printed to a silk-screen printer and then removing that printed object from the printer so that it can be conveyed towards subsequent working stations. The transport means, in general, comprises two vertical longitudinal plates each provided along its length with a plurality of equidistantly spaced-apart notches or seats for receiving the corresponding ends of the objects to be printed. During transport, the objects are first clamped and then moved from one rest position, i.e., opposed set of notches, to another set of notches immediately downstream, arcing in clockwise motion above a center line during transport. At the same time, the longitudinal plates are caused to move in an upstream direction so that the free pair of upstream notches can be loaded with another object. And, then the operation reverses. Thus, the plates and clamping means operate so as to rotatably reciprocate in opposite directions over circumferential arc paths, on opposite sides of a centerline. At the same time that the objects are being moved by respective clamps to the next downstream set of notches, the device for presenting and removing an object from the print screen rotates in a counterclockwise direction to remove an object from the printer and at the same time to pick up an object from the furthest downstream location of the transport means (i.e., the last set of notches) so as to present it to the printer, to be printed. This device comprises a double gripper means located on one arm of the device for removing an object from the printer and a double sucker (i.e., suction cups or "nests") located on another arm of the device for picking up an object from the transport means and presenting it to the silk-screen printer. Thus, this latter device rotates in a counterclockwise arcing direction at the same time that the clamping means on the transport device operate in a clockwise arcing motion. Then, as the clamping means operate in the reciprocal direction, the double gripper means and double sucker operate in a clockwise motion. With such rotatable motion, the suction nests and double gripping means also operate above and below a centerline, parallel to that of the operation of the clamping means and longitudinal plates. Subsequent to the removal from the print zone, the objects are conveyed towards other downstream working stations by, apparently, like transport means, as earlier described.

Although the apparatus disclosed in U.S. Pat. No. 4,398,627 may be found suitable, at least in certain printing applications, its use is believed attendant with certain disadvantages. First of all, it is an extremely complex apparatus and requires numerous tie rods and mechanical linkages. Two sets of clamp bars must arc clockwise above a center line in perfect synchronization with two sets of complex cam operated suction nests operating counterclockwise below another centerline. The accessibility for repair; when needed, or for adjustment and changeover to other size objects seems somewhat limited. And, there are many moving parts that present the potential for injury to the operator or set up person. At high operating speeds, instability is believed likely to be encountered, as the machine can resemble a "thrasher" in its operation.

SUMMARY OF THE INVENTION

With the foregoing in mind, it is an important object in the broader aspects of the invention to provide an improved means for transporting ware in stepwise fashion from one location to another.

Another important object of the invention is to provide improved means for transporting and presenting ware to be printed to a printing machine not attendant with the problems above-mentioned.

More particularly, an object of the invention is to provide means capable of high productivity for transporting and presenting ware to be printed to a printing machine.

A further object of the invention is to provide a transport system for transporting ware, one piece at a time in stepwise fashion and means of presenting each such piece of ware to a silk-screen printer, all of relatively simple construction and operation.

A further object is to provide a transport device for ware and means operatively connected thereto in timed relationship for presenting the ware to a silk-screen printer of reduced inertia levels and good stability.

Quite advantageously, the transport means of this invention comprises a simple elongated beam that operates in a reciprocal arcuate motion below the plane of travel of the ware being transported whereby to avoid interference with other work stations, all of which are located above the plane of travel.

A further advantage of the invention is that the transport means both upstream and downstream of the printer station is one and the same, and results in a silk-screen printing system of relatively simple, compact design.

A further advantage of the invention is that such allows easy changeover, providing for the transport and printing of articles of various sizes and shapes.

A still further advantage is that the printing and other work stations comprising the system are all mounted in combination with the machine frame, resulting in better stability at high operating speeds.

A still further advantage of the invention is that, during operation, the clamping and holding means in combination with the transport means moves only to open and close, operating in a perpendicularly lateral direction to the reciprocal lengthwise movement of the transport means.

BRIEF DESCRIPTION OF THE DRAWINGS

Some of the features and advantages of the present invention have been described; others will become apparent from a reading of the detailed description which follows, taken in conjunction with the accompanying drawings in which.

DETAILED DESCRIPTION OF THE DRAWING AND THE PREFERRED EMBODIMENTS

While the present invention will be described hereinafter with particular reference to the accompanying drawings, it is to be understood at the outset that it is contemplated that the present invention may be varied in specific detail from that illustrated and described herein while still achieving the desirable characteristics and features of the present invention. Accordingly, the description which follows is intended to be understood as a broad enabling disclosure directed to persons skilled in the applicable arts, and is not to be understood as being restrictive.

Figure 1:
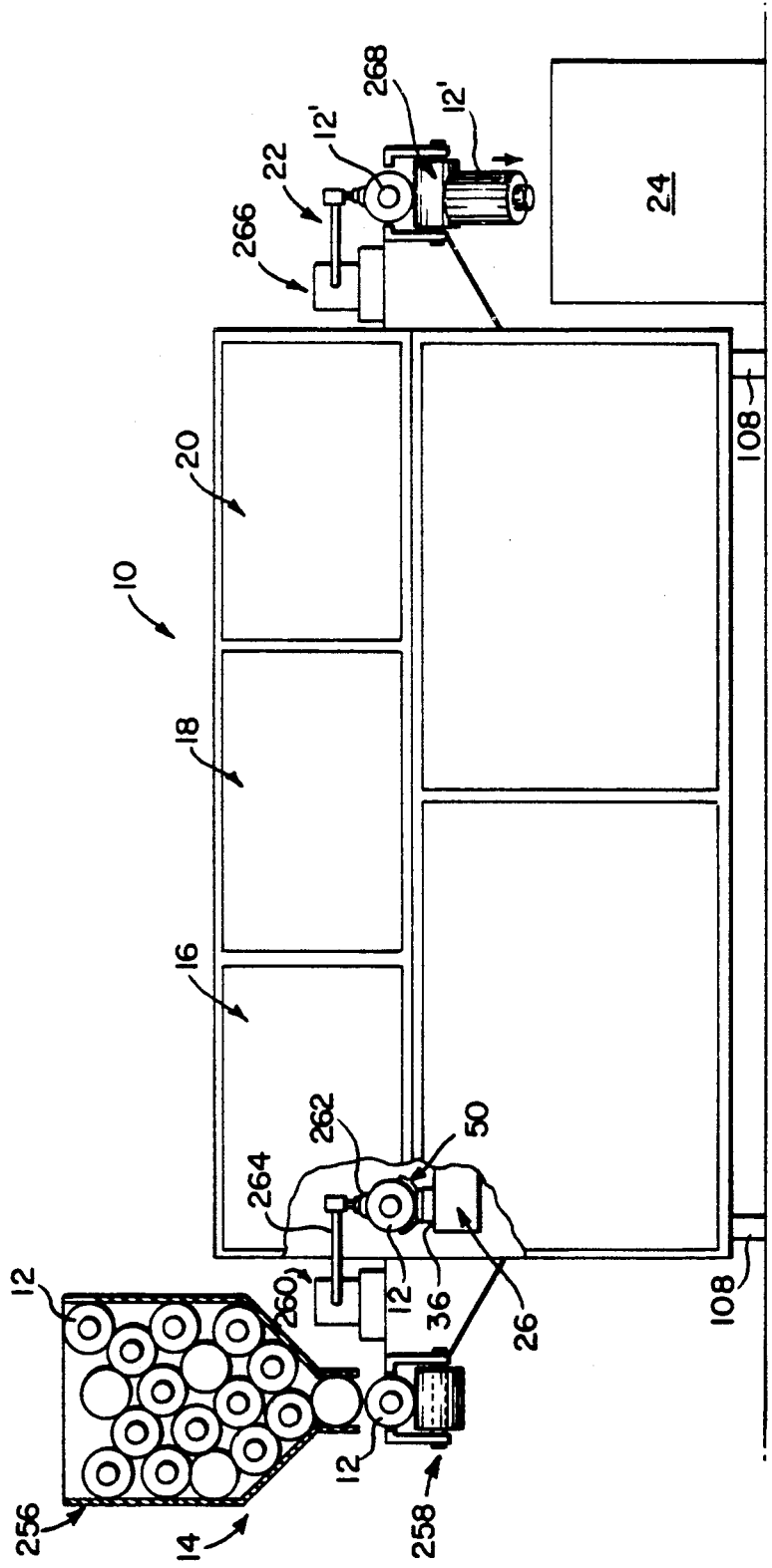
FIG. 1 is a front side view showing a typical enclosed silk screen printing system according to the invention for the printing of plastic containers having a feed means, a pretreatment station, a printing station, an ink-curing station, and a discharge means.

Turning now to the drawing there is shown in FIG. 1 thereof a typical layout of a system 10 having automatic apparatus for the silk screen printing of articles or ware 12 e.g., plastic bottles, comprising, in sequence and operative combination, a conventional feed means 14, an enclosed system comprising a pretreatment zone 16, a printing zone 18, and a curing zone 20. Subsequent to curing, the printed objects 12, are removed from the system 10 by means 22 and conveyed to a location to be placed in a suitable carton 24 according to conventional techniques, for later filling, as desired.

Figure 2:
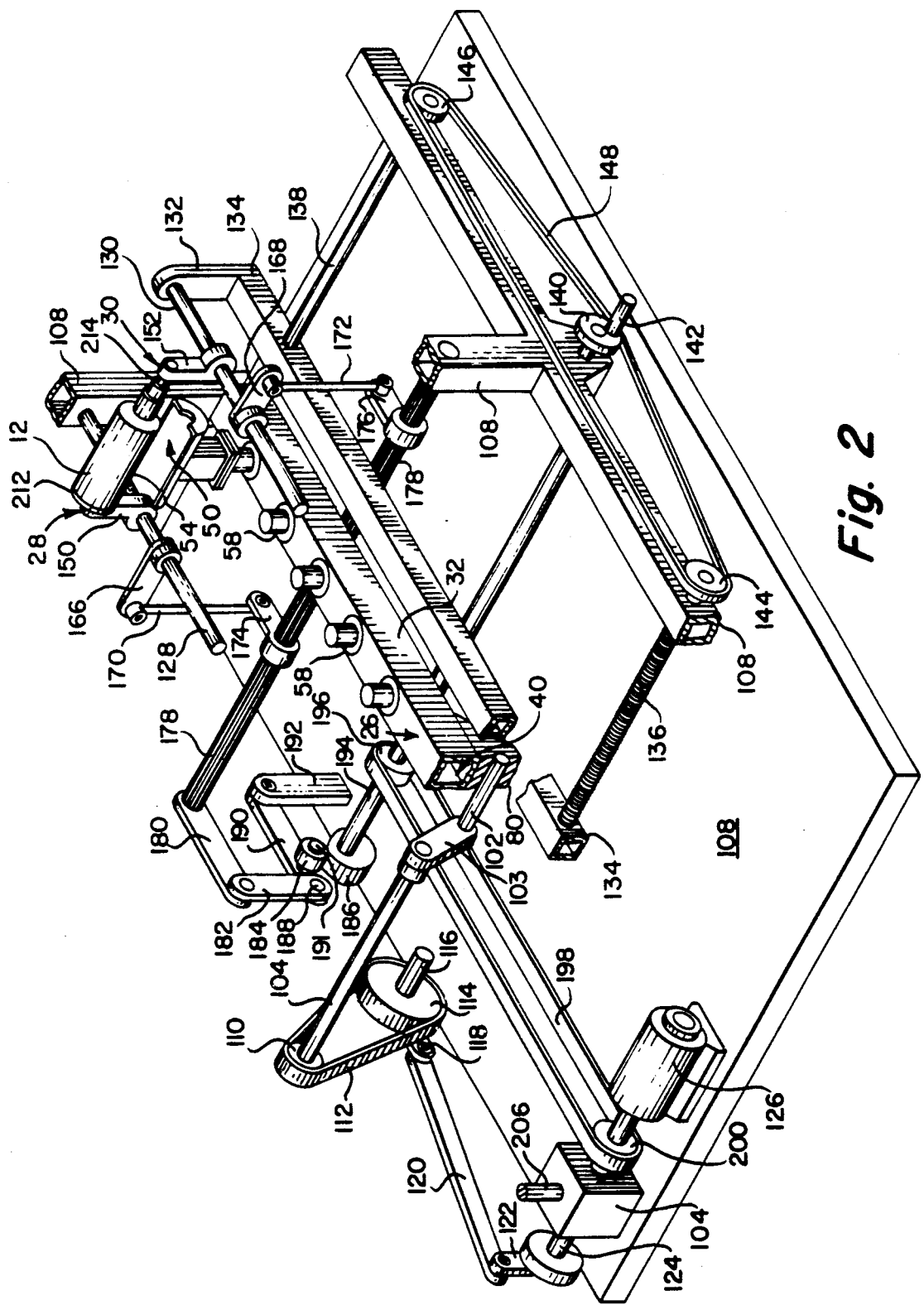
FIG. 2 is a schematic perspective view showing only a portion of the elongated transport beam in operative combination with only a portion of the clamping and holding means for plastic containers to be transported from one location to another to be printed, or otherwise worked on, comprising the major components of the novel transport system according to one aspect of the invention.
Figure 3:
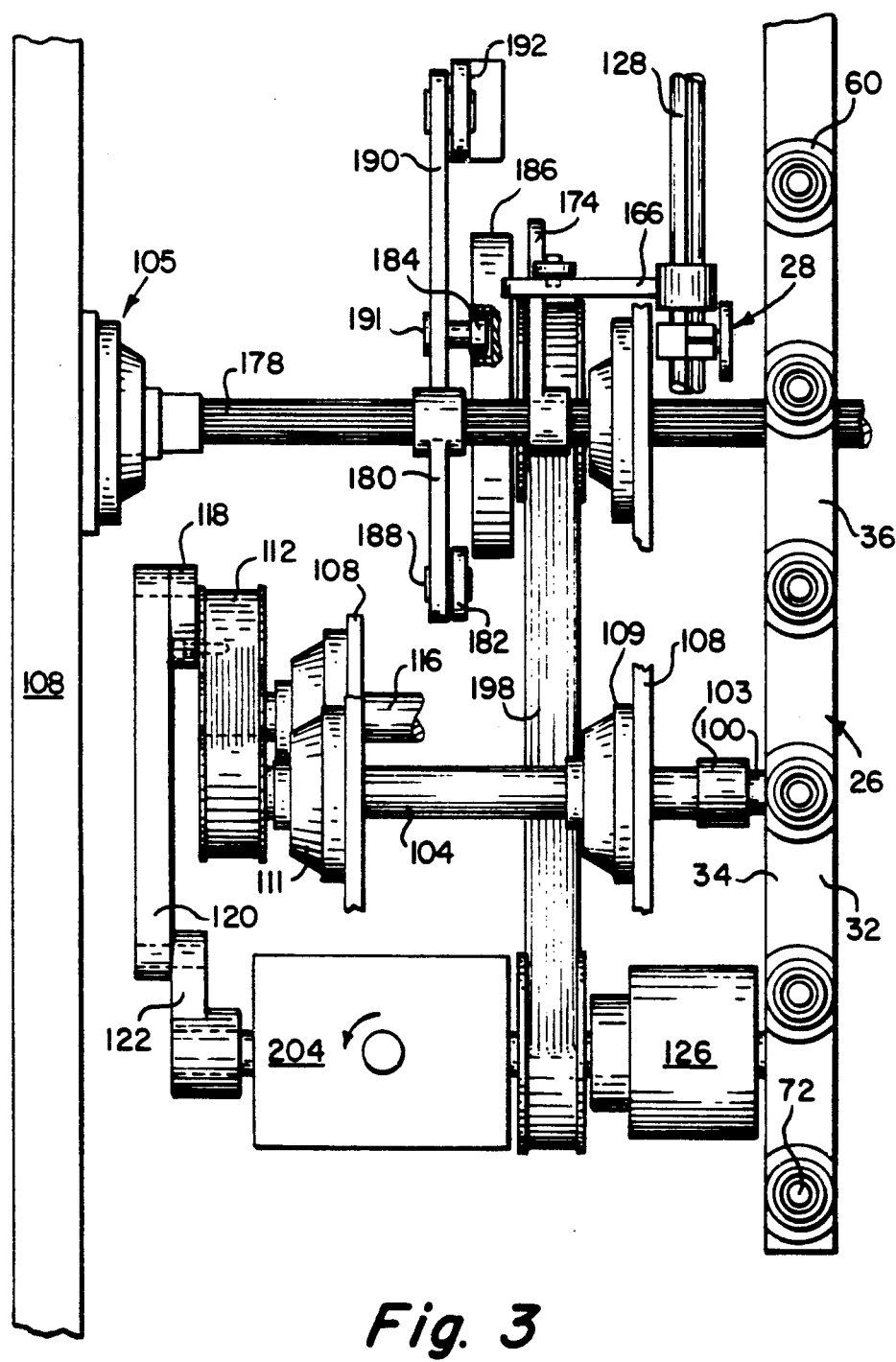
FIG. 3 is a schematic top plan view of a portion of the apparatus shown in FIG. 2 showing the linkage for moving the elongated transport beam in a reciprocal lengthwise direction and the opening and closing of the clamping means.

Within the enclosure shown in FIG. 1, there is a system, in accordance with the invention, for transporting the articles 12 in lengthwise direction through the various work stations comprising, in operative combination, best seen from FIG. 2, an elongated transport member or beam 26 and a clamping system comprising a plurality of clamps 28, 30.

Figure 8A:
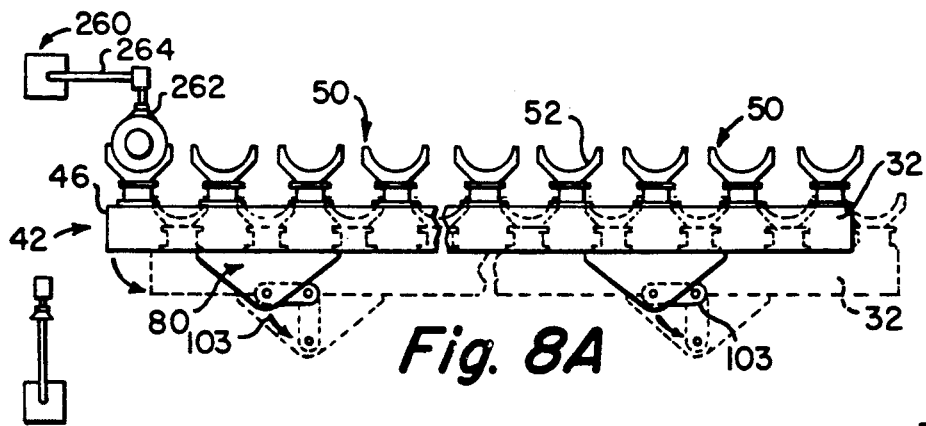
FIGS. 8 a-e are diagrammatic side views showing the reciprocal movement in progression of the elongated transport beam back and forth in a lengthwise direction describing an arc of 180 degrees.
Figure 8B:
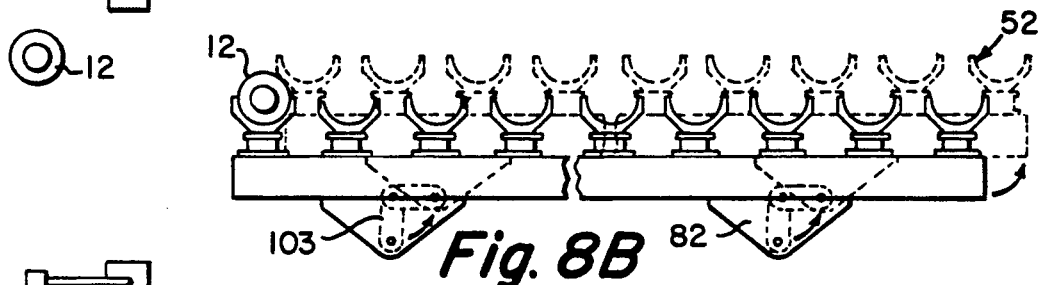
Figure 8C:
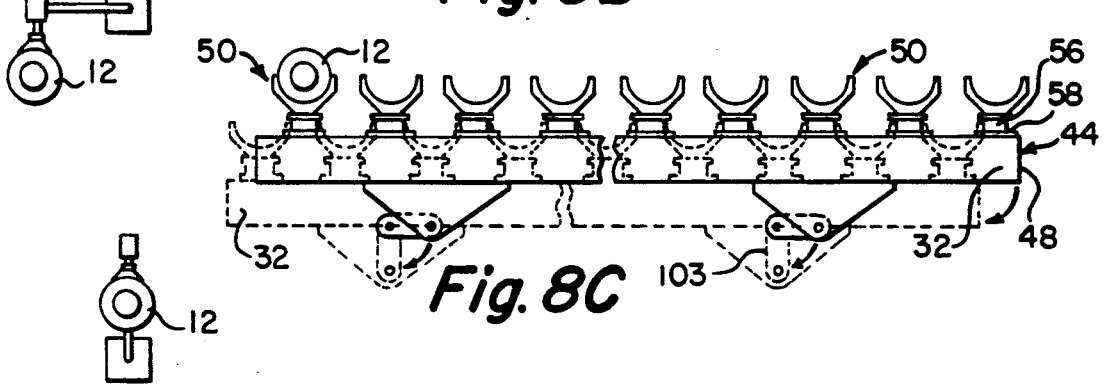
Figure 8D:
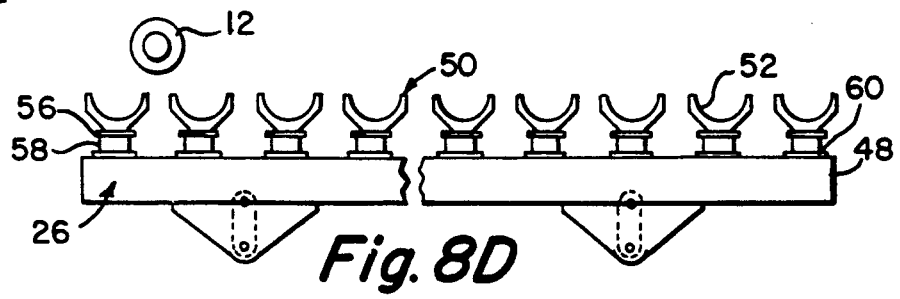
Figure 8E:
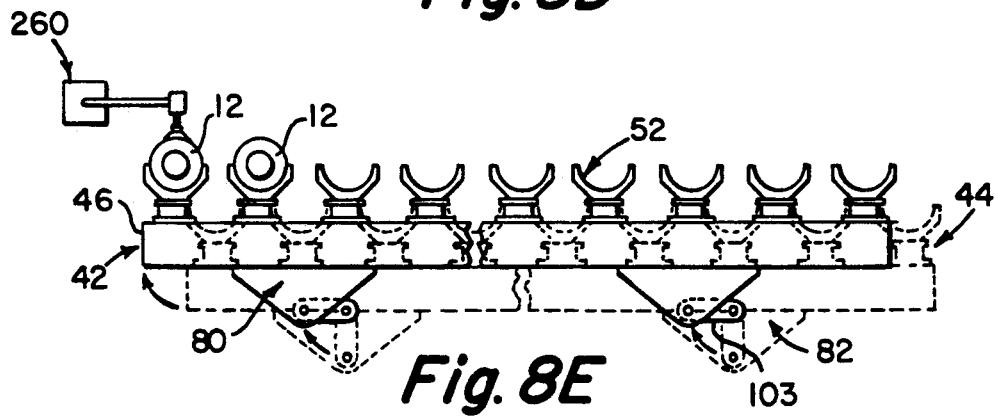
Figure 9A:
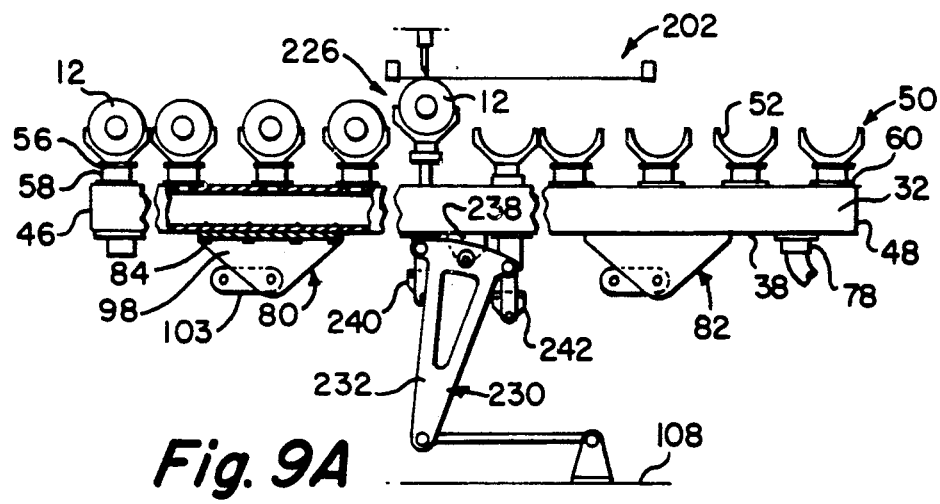
FIGS. 9 a-c are schematic side views showing the movement of the two next adjacent carriers located below the print station vertically up and down as the elongated transport beam is reciprocated back-and-forth in lengthwise direction, showing only a portion of the beam and a smaller portion of the beam in a longitudinal, cutaway section showing the internal cavity in the beam and its connection to the two members supporting the beam in horizontal disposition.
Figure 9B:
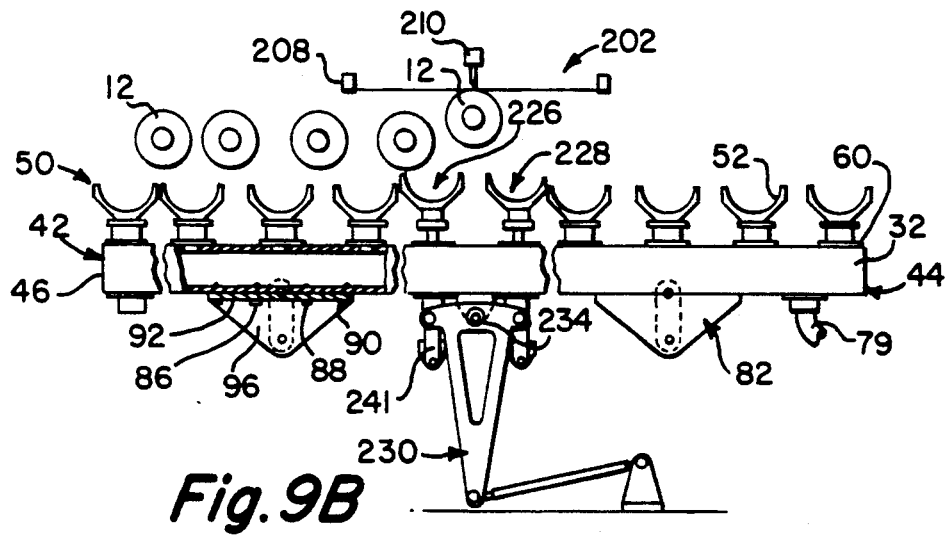

The elongated transport beam 26, is horizontally disposed, as best shown in FIGS. 8, 9, and of a square-shaped cross-section (FIG. 5) comprising spaced-apart, vertically disposed, planar side walls 32, 34 and top and bottom, spaced-apart, horizontally disposed, planar members 36, 38. Transport beam 26 can be an aluminum extrusion whereby the side walls and top and bottom members are provided integral with one another during extrusion. Or, if desired, the side walls and top and bottom members can be separately manufactured and then connected together by various conventional means, e.g., by providing flanges on the side walls which extend vertically outwardly from the side wall members at the top and bottom edges. The top and bottom members, in such case, will have a width coinciding with the flanges, and the flanges of the side walls and the top and bottom member can be provided with suitable openings and then be bolted together with nuts and bolts, according to usual technique. Whatever the manner of fastening, however, the surfaces where the side walls 32, 34 and top and bottom members 36, 38 are connected together should be sealed whereby to produce an air tight internal cavity 40, the reason for which will hereafter be made clear. The transport beam 26 is closed at its upstream and downstream ends 42, 44, respectively, by vertically disposed planar end members, as shown by reference numerals 46, 48.

Although the elongated beam 26 shown herein is of a square-shaped cross-section, it will be appreciated that such need not be the case. The beam 26 can be of a rectangular or other shape, including circular-shaped cross-section.

Figure 5:
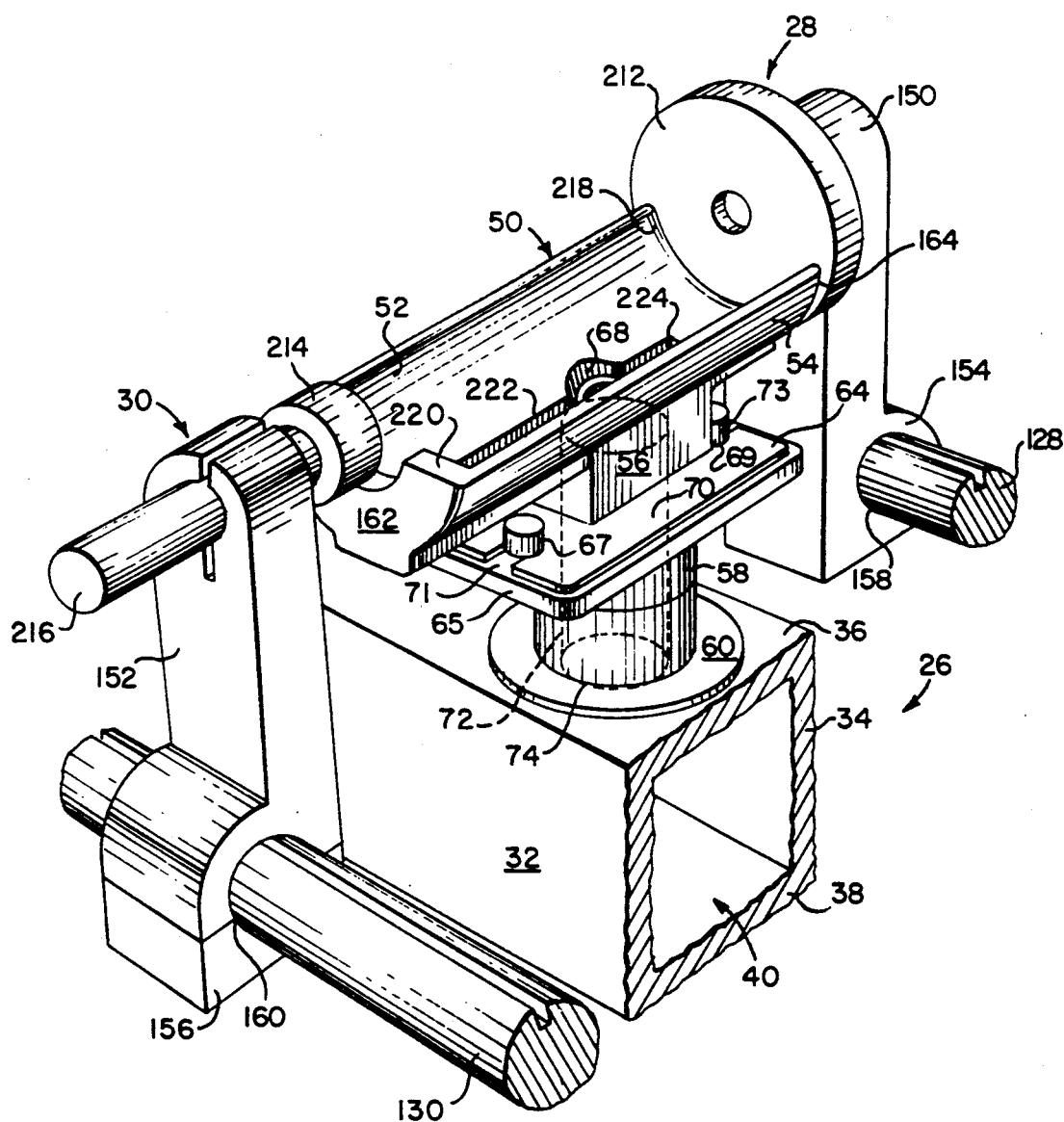
FIG. 5 is an enlarged perspective view showing the pair of clamps seen in FIGS. 2 and 4 in operative association with the elongated transport beam in cross-section and showing one of the ware carriers, or holders, supported on the transport beam, taken from the downstream end.
Figure 7:
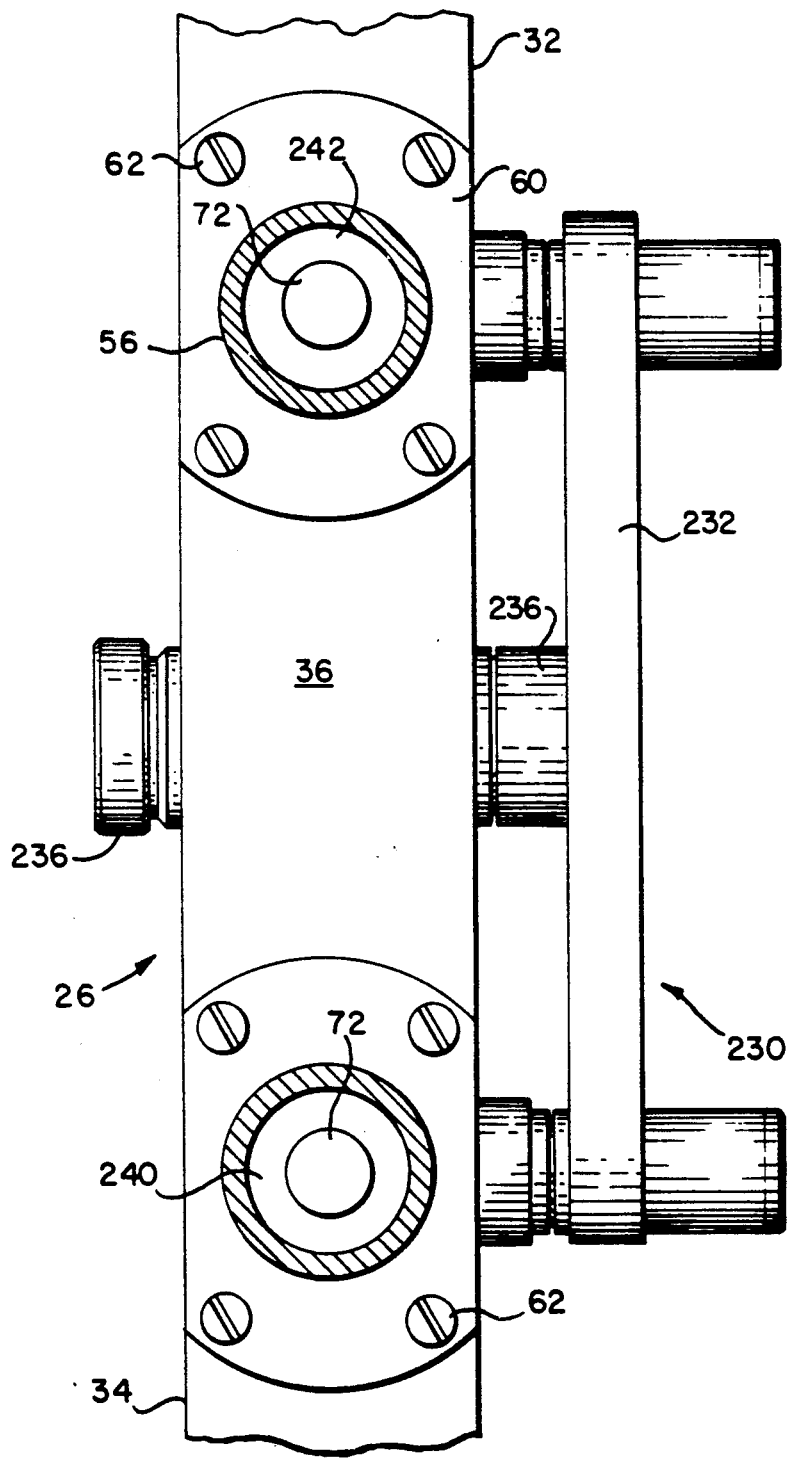
FIG. 7 is a top view looking down at the elongated transport member at the location of the two adjacent vertically reciprocating wareholders and the top of the lift link in combination with such wareholders.

Connected to the top member 36 of the elongated beam, there is provided a plurality of article or wareholders 50, each spaced-apart from one another a predetermined distance along the length of the beam. These wareholders each comprises an elongated carriage member, or nest 52, having an arcuate shape, in this case, semi-circular. Attached to the bottom surface 54 of each wareholder is an elongated circular-shaped fitting 56 (FIGS. 8,9) which, in turn, is detachably connected to circular-shaped fitting 58 connected to the transport beam 26. The fitting 58 can be provided with a circular-shaped flange 60, at its base, through which suitable openings (not shown) are provided which match with openings (not shown) provided in the top member 36 of the elongated beam. Through these openings, as shown in FIG. 7, extend threaded bolts 62, at the end of each of which is provided a threaded nut (not shown). The fittings 56 can be provided integral with bottom 54 of the wareholders 50, as shown in FIG. 5, or manufactured separately and attached to the bottom 54 according to various usual techniques. This will depend somewhat upon the material of construction, e.g. metal or plastic. Moreover, the fittings 56 need not be circular-shaped, as shown in FIG. 8. Instead, fitting 56 can be of a square or rectangular-shape, as shown in FIG. 5, if desired. In such a case, fitting 56 can be provided with flange 64 extending perpendicularly outwardly from the fitting at its outer end, as seen in FIG. 5. More will be disclosed about this shortly.

The fittings 58, likewise, can be attached to the elongated beam 26 other than by threaded bolts, as disclosed, according to conventional practice. Furthermore, such a fitting need not be provided with a flange at its base. If desired, these fittings may be provided without a base and comprise an elongated annular-shaped fitting fixedly connected directly to the top surface 36 of the beam. This can be accomplished by various conventional techniques and will depend somewhat upon the material of construction of the beam, metal being preferred. Nevertheless, in some applications, the beam can be, if desired, molded from a suitable plastic material. In such a case, the fitting 58 may be provided integral with the beam. No matter how the fittings 58 are provided on the elongated beam, however, such should be connected thereto to provide a sealed connection, the reason for which will soon be disclosed.

Figure 4:
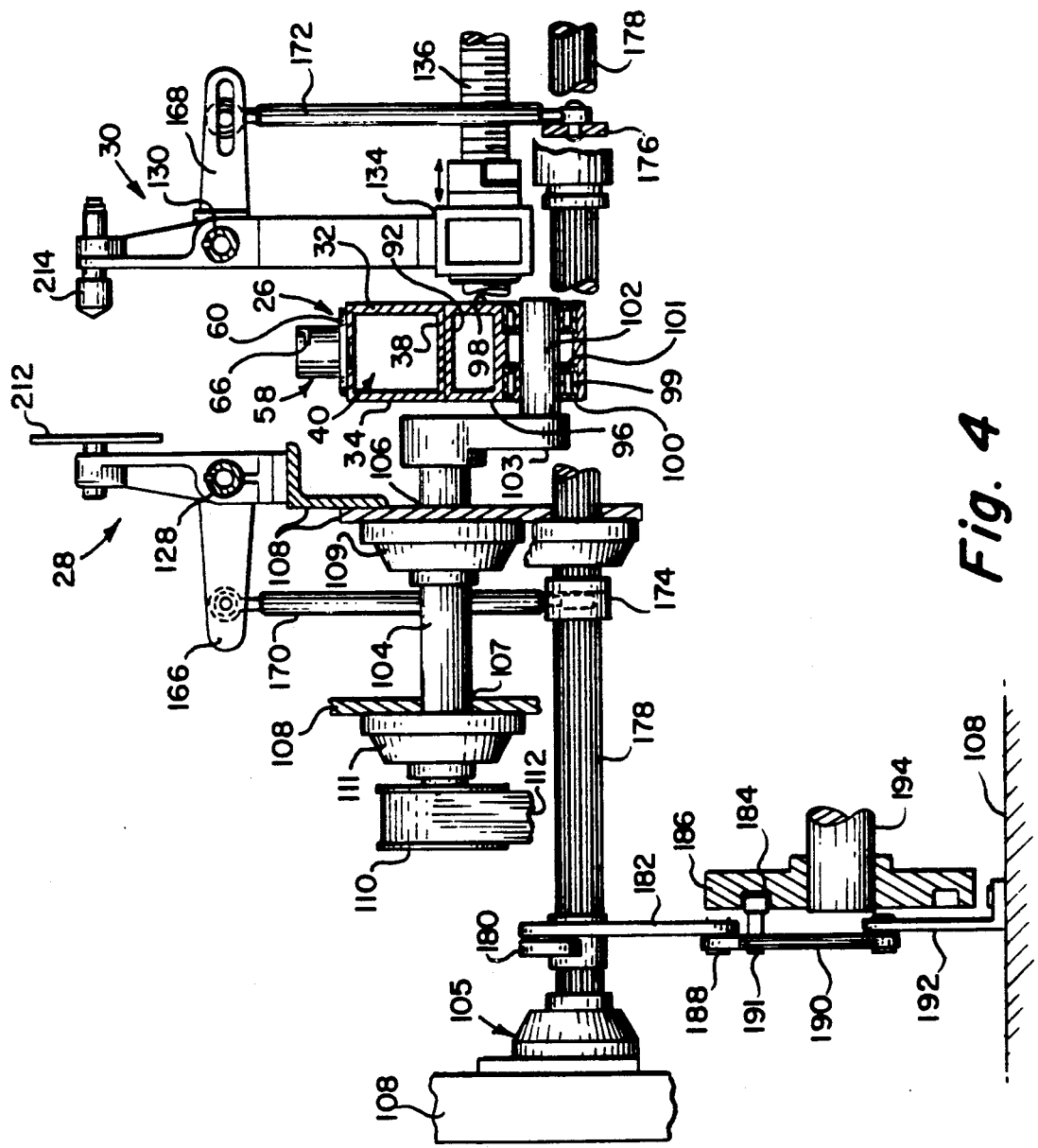
FIG. 4 is an end view of a portion of the apparatus shown in FIG. 2 showing the elongated transport beam in cross-section with a part of the linkage for moving such in a reciprocal lengthwise direction and one pair of clamping means for clamping and holding a plastic bottle or the like and that portion of the frame supporting one of the clamping means for movement toward and away from the other of the clamping means to accommodate plastic containers of different lengths, taken from the upstream end.
Figure 6:
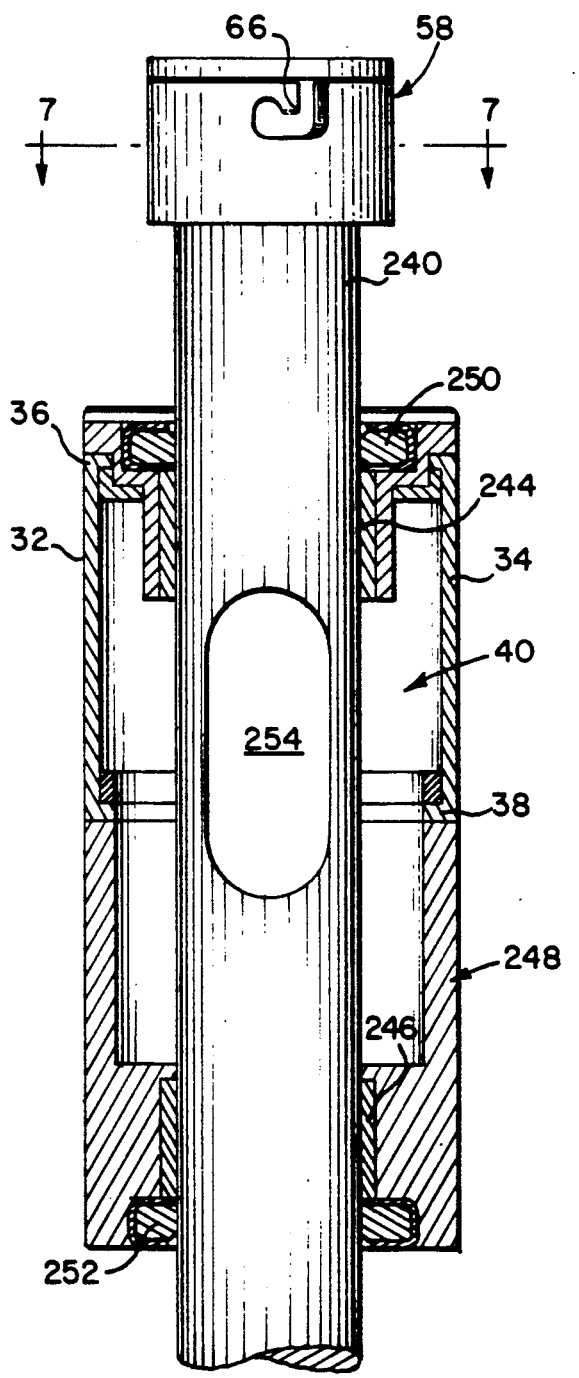
FIG. 6 is a view in cross-section showing the inside cavity in the elongated beam and the mounting of the vertically reciprocating wareholders.

The fittings 56 and 58 can be detachably connected together by various conventional means, e.g. a bayonet type connection as will be appreciated by reference to FIGS. 4 and 6. Thus, the fitting 56 can be of somewhat larger diameter at its outer end than the outside diameter of fitting 58 and provided with a circular-shaped recess (not shown). In this case, the fitting 58 will be provided with an outer end having a diameter approximately that of the diameter of the recess provided and such end will bottom out with a shoulder of somewhat larger diameter. Thus, the end of fitting 58 will intrude into the recess provided in the outer end of fitting 56 in male-female fashion. The recess should extend inwardly a sufficient distance to accommodate the smaller diameter end provided on fitting 58 so that the end of fitting 56 and the shoulder on fitting 58 interface with one another in usual manner. Although not shown, it will be appreciated that pins diametrically opposed to one another can be provided on the vertically disposed surface of the recess in fitting 56, which mate with the diametrically opposed grooves of the bayonet connection such as indicated by reference numeral 66 provided in the outer peripheral surface of the circular-shaped fitting 58 according to usual technique. A circular-shaped spring (not shown) or other compressible member can be provided in combination with the recess provided in the end of fitting 56, as conventionally done, for providing a tight connection with fitting 58 when the two fittings are joined together. Regardless of how these two fittings are joined together, however, an air tight seal need be provided.

Returning now to FIG. 5 and the fitting disclosed therein, it is seen that fitting 58 is provided at its outer end with a rectangular-shaped flange 65 extending perpendicularly outwardly from the end. Flange 65 is of the same shape as flange 64 and the two are coextensive in size and shape. The two fittings, in this case, are detachably connected together by means of threaded members 67, 69 which are located in the cut-outs 71, 73 provided in flange 64 and extend into threaded openings (not shown) provided in flange member 65.

In each nest 52 there is provided a circular-shaped opening 68 which communicates with circular-shaped, elongated, centrally disposed openings 70, 72 provided, respectively, in each of the fittings 56, 58. These openings, in turn, communicate with one another and with the internal cavity 40 of the elongated beam through circular-shaped openings 74 provided in the top member 36 (FIGS. 5,9).

At the upstream and downstream ends 42, 44 of the elongated transport beam 26 there are provided, in the bottom member 38, adjacent the end walls 46, 48, openings (not shown), the purpose for which will later be explained. These openings can each be provided, if desired, with fittings 76, 78 having an internal thread pattern (not shown), according to usual techniques, for coupling the fittings to threaded closure members (not shown) or another fitting, as desired, e.g. a fitting (not shown) provided at the end of conduit 79. Thus, conduit 79 will communicate with internal cavity 40. This conduit can be connected at its other end to a suitable, conventional vacuum turbine (not shown), the purpose for which will be later disclosed. A vacuum turbine is preferred over a vacuum pump as such provides a greater flow of air through the cavity 40 and somewhat less vacuum. Nevertheless, a vacuum pump can be used, instead, if desired. The desired flow of air to be provided by the vacuum turbine can vary, depending somewhat upon the size of the bottle to be printed. In general, however, the greater the size of the bottle to be processed, the higher should be the air flow. The optimum air flow to be provided by a turbine for any particular size bottle to be processed can be readily determined by those skilled in the art.

The transport beam 26, as will be appreciated by reference to FIGS. 8 and 9, is supported for reciprocal movement in lengthwise direction, as later more fully disclosed, by support members 80, 82. These support members are located near the respective ends of the transport beam 26 and can be connected to the bottom member 38 of the transport beam by various means, e.g., conventional threaded members, which are referred to generally in FIG. 9 by reference numerals 84, 86, 88, 90. These threaded members, as will be appreciated by those skilled in the art, can extend through openings (not shown) provided in both the top connection member 92, 94 (not shown) of the support members 80, 82 and in bottom member 38 of the transport beam. The support member 80 (82 is of like design) can be of generally rectangular-shaped construction having a top, planar, connection member 92, as shown in FIGS. 4 and 9 and two parallel vertically disposed support arms 96, 98 extending perpendicularly downwardly therefrom (FIG. 4), and terminating at lower, horizontally disposed member 99. Or, if desired, the support members 80, 82 can be of solid construction as shown in FIG. 2. The particular construction of the support members is of no consequence provided such allow the beam to reciprocate in back and forth lengthwise direction, hereafter more fully disclosed. The support member 80 is provided with a laterally extending opening 100 in which is provided a conventional bearing member 101 for pivotally supporting an elongated, circular-shaped rod 102 as best seen in FIG. 4. At the free end of rod 102 there is pivotally connected a link 103 which, in turn, is fixedly connected at its other end to elongated horizontally disposed drive shaft 104 which extends through openings 106, 107 in members of the frame 108. The drive shaft 104, as will be appreciated more fully later on, is rotably supported by suitable conventional bearing members 109, 111 provided in association with openings 106, 107, as conventionally done. The frame members 108 are a portion of the frame that supports the entire printing system and its various component parts.

On the drive shaft 104, at the other end, there is fixedly connected an annular-shaped pully 110 over which belt 112 is operatively connected for the reciprocal driving of drive shaft 104 back and forth 180 degrees, according to usual techniques. The purpose of this will be further disclosed later on. The drive belt 112 is driven by wheel 114 which is supported for rotation on shaft 116 (FIG. 2) which is horizontally disposed in lateral perpendicular disposition to beam 26 and fixedly connected to the frame. Pivotally connected to drive wheel 114 is one end of link 118 which, in turn, is pivotally connected at its other end to one end of link 120. The other end of link 120 is pivotally connected to one end of link 122, the other end of which is fixedly connected to horizontally disposed drive shaft 124. The drive shaft 124 is connected at its other end to a motor 126 which is supportedly connected at its base (not shown) to the base member of frame 108. Although not shown in the drawing, for sake of clarity, drive shaft 124 can be rotatably supported in frame members 108, if desired. Further, it will be readily appreciated by those skilled in the art that shaft 124, between the motor 126 and drive pulley 200 will be connected to motor 126 through appropriate reduction and safety clutches, all according to conventional techniques. This, of course, will depend somewhat upon the rpm. of the particular motor used. For example, reduction should be such as to provide a nominal maximum drive shaft rotation of about 100 rpm. Thus, in this case the system will handle approximately 100 bottles per minute.

Although not shown in the drawing, for sake of clarity, drive shaft 104 is operatively connected to a shaft (not shown) located downstream and which is parallel to shaft 104 and in the same horizontal plane. This other shaft is supported by the frame 108, as is shaft 104, so that it can also be rotated back and forth 180 degrees. The other end of this downstream shaft is connected to support means 82 by means of a pivotal link, the same as is link 103 connected to support means 80. Although not shown in the drawings, compensating links 90 degrees out of phase, respectively, with link 103 and the downstream link (not shown) will, most desirably, be provided on the respective drive shafts 104 and the one provided downstream (not shown.) The links will be connected to one another at their outer ends by a tie rod (not shown), horizontally disposed and parallel to beam 26. Beam 26 will then be stabilized when it is at its maximum forward and rearward positions during operation.

Figure 9C:
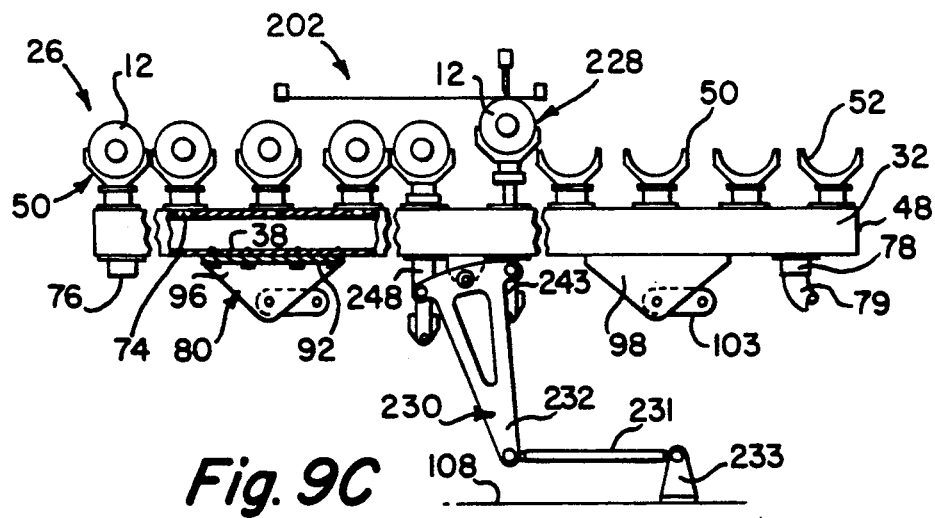

Thus, in operation, on rotation of drive shaft 124, link 122 will travel 360 degrees, causing link 118 to rotate back and forth 90 degrees. The drive wheel 114 will then cause drive shaft 104, and the forward drive shaft (not shown), operatively connected thereto, to be rotated back and forth 180 degrees. As a result, the transport beam 26, will be caused to move back and forth in its lengthwise direction so as to be in the same horizontal plane at the end of each pivotal stroke. In the forward movement, as shown in FIGS. 9a, b, the transport beam 26 moves downwardly below the horizontal plane defined by its top planar member 36 when the beam is in the rest position and then upwardly to the same horizontal plane (FIG. 9c) to a second position of rest. Then, it moves rearwardly in lengthwise direction over the same path of travel, as seen in FIGS. 9a, b, c. Thus, the transport beam 26, looking at it from a side direction, as shown in FIG. 9, is mounted and supported so as to be reciprocated back and forth in a lengthwise direction while its ends describe a semicircle, i.e., a path of 180 degrees below the plane of rest.

As will be readily appreciated by those skilled in the art, the various linkages connected to one another, and to support members 80, 82 can be of various lengths provided such operate, in combination, to cause the transport beam 26 to operate in the manner just described, i.e., to reciprocate back and forth lengthwise describing an arcuate path of 180 degrees, based upon the horizontal plane of rest defined by the top member 36 of the transport beam. Although the maximum arcuate path of travel will be 180 degrees, the beam need not necessarily describe such arc. An arcuate path of from about 150 degrees to about 180 degrees will be found satisfactory in the practice of the invention. Nevertheless, the minimum arcuate path traveled by beam 26 should not be less than about 150 degrees.

Turning now to FIGS. 2 and 4, there are shown therein elongated, circular-shaped, horizontally disposed support bars 128, 130, each of which is rotatably supported at its respective ends The support bar 130 is supported by vertically disposed support members such as that referred to by reference numeral 132. These support members are fixedly connected at their bottom ends to a horizontally disposed member 134 which extends in a lengthwise direction and is parallel to transport beam 26. Connected to member 134 are threaded shafts 136, 138 each of which is parallel to the other and is perpendicularly disposed to member 132. The other ends of shafts 136, 138 are rotably supported by a horizontally disposed member of the frame 108 and extend through suitable openings provided therein, as shown in FIG. 2. As shown in the drawing, there is fixedly connected a crank 140 having a handle 142. The ends of shafts 136, 132 are fixedly connected to sprockets 144, 146, respectively. The sprockets are, in turn, operatively connected to crank 140, by drive chain 148. Thus, as crank 140 is rotated, the member 132 can be caused to move in a horizontal plane in a direction toward and away from the transport beam. This causes the distance between clamp members 28, 30, to be larger or smaller, as desired, to accommodate different sized bottles.

The rod 128 is rotably supported at its ends by members of the frame 108, or by vertically disposed stanchions connected to a horizontally disposed frame member parallel to the transport beam 26, like that referred to by reference numeral 134. In any event, rods 128 and 130 are mounted so as to be in opposition to one another, spaced apart a predetermined distance in the same horizontally disposed plane parallel to the plane defined by top member 36 of the transport member 26, and on opposite sides thereof a predetermined distance, depending somewhat upon the size of the plastic bottle 12 being transported, as seen in FIG. 2. Mounted on the parallel rods 128, 130, in predetermined spaced-apart location, are a plurality of clamp members 28, 30, only one of which is shown in FIG. 2 for sake of clarity. These members, as best seen in FIGS. 4, 5, are located in opposition to one another and opposite the respective ends of the wareholder 50. The clamp members 28, 30, each comprises a vertically disposed leg, identified by reference numerals 150, 152, respectively, which terminate in body members 154, 156. The body members are each provided with openings such as identified by reference numerals 158, 160 through which extend elongated rods 128, 130. The clamping members 28, 30 are each fixedly connected to respective rods 128, 130 so that when these rods are rotated back and forth, as later more fully disclosed, the vertically disposed legs 150, 152 are caused to move toward and away from one another. Although the distance between next adjacent clamping or gripping members 28, 30 can vary somewhat, that distance should be the same distance that next adjacent wareholders 50 are mounted. A wareholder will be so located on the transport beam 26 that when such is in its horizontally disposed rest position, on the forward or reverse stroke, an opposed pair of gripping members 28, 30 will be directly in line with and opposite to the respective ends 162, 164 of a wareholder, as will be seen from FIG. 5.

At a point about midway between the ends of the rotatable support bars 128, 130, there are fixedly connected, respectively, crank arms 166, 168. These crank arms extend in opposite directions from one another and in a horizontal plane perpendicularly outwardly from the respective support bars, as shown in FIG. 4. The outer ends of the respective crank arms are pivotally connected to the upper ends of vertically disposed connecting rods 170, 172. The bottom ends of the connecting rods 170, 172 are, in turn, pivotally connected to the outer ends of links 174, 176 each of which extends in horizontal disposition perpendicularly outwardly from elongated shaft 178. These links are in parallel disposition to one and extend in lengthwise direction of the printing system the same as does transport beam 26, and rods 128, 130. The forward end of the horizontally disposed shaft 178 is located in a conventional bearing mount (not shown) provided in a frame member 108 the rear end being located in bearing mount 105. Shaft 178 extends in lateral disposition, perpendicular to the elongated support bars 128, 130, at the distal end of which is fixedly connected one end of a link 180. This link is pivotally connected at its other end to link 182 which extends downwardly and is pivotally connected at the other end by means of pin 88 to one end of link or cam follower rod 190 on which is located a cam follower 184 which is in operative association with a cam 186. The cam follower 184 is rotatably supported on link 190 on a horizontally disposed rod 191. Link 190 is pivotally connected at its other end to vertically disposed stanchion 192, connected at its bottom end to a base member or the like of the frame 108. The cam 186 is shown in schematic manner in FIG. 2 for sake of greater clarity in describing its construction. The cam provides a travel such that when the cam is rotated 360 degrees it opens and closes the clamping members 28, 30 once in a complete rotation. The cam 186 is fixedly connected in usual manner to one end of drive shaft 194 supported in horizontal manner for rotation in lateral disposition perpendicular to transport beam 26, in members of the frame 108 (not shown). On drive shaft 194, there is provided a pulley 196 over which rides a belt 198 disposed in lengthwise direction parallel to beam 26 and which is, in turn operatively connected to pulley 200 fixedly connected on drive rod 124. Thus, during operation, as drive rod 124 is rotated, it operates to cause reciprocal back and forth movement of the transport beam in a lengthwise direction and the synchronized opening and closing of the clamping members 28, 30. More about this will be later disclosed.

The drive rod 124 is, in the preferred aspects of the invention, operatively connected (not shown) by means well known to those skilled in the art to a silk screen printing mechanism, as represented, in general, in FIG. 9 by reference numeral 202 via means 204 and vertically disposed drive shaft 206. According to usual manner, the silk screen printer comprises a horizontally disposed screen frame 208 including squeegee 210. The frame moves back and forth, in a horizontal plane, in timed relationship with the operation of the elongated transport beam and gripping members, hereafter described. The plane of travel of the silk-screen frame, as will be appreciated by those skilled in the art, is parallel to that of the top member of the transport beam 26.

The clamping members 28, 30, as best shown in FIG. 5, are provided with a gripping cup or plate 212 and a nose cone 214, respectively, for gripping and holding a plastic bottle or other ware, as seen in FIG. 2. These gripping members can take various configurations known to those skilled in the art, depending somewhat upon the particular ware being transported. The nose cone can be of the inflatable type or a solid component as desired. Generally, the nose cone is spring mounted so that the rod 216 is capable of moving in and out slightly to better accommodate the article being transported and to provide secure gripping and holding thereof. Such feature is well known, however, and is believed to require no detailed disclosure in this application.

The wareholders 50 can be of various configuration depending somewhat upon the shape of the ware being transported. In general, however, the wareholder will be elongated, as shown in FIG. 5, and have a nest 52 conforming to the shape of the ware transported. Thus, wareholders can be provided to accommodate not just cylindrical-shaped bottles but those of conical, oval, and rectangular shape, as well. In the preferred aspects of the invention, the wareholders 50 located downstream of the printing station will be provided with rims 218, 220 at their ends which hold the article just printed off the nest surface 52 so that the still wet or uncured printing ink is not smudged. Those wareholders located prior to the printing station can, if desired, have a shape that allows the article of ware to rest directly on its nest or supporting surface 52. Thus, in the case of a cylindrical-shaped container, the supporting surface will be arcuate-shaped preferably defining an arc of about 150-180 degrees.

In the more preferred aspects of the invention, the wareholders 50 will each be provided with openings 68, as shown in FIG. 5, which communicate with the internal cavity 40 in beam 26. Thus, in high speed operations, particularly, a vacuum can be, if desired, applied to each of the articles of ware, as such are being transported. Accordingly, the articles of ware will each be held rather securely on its respective wareholder. This is accomplished by connecting a suitable vacuum turbine, as earlier disclosed, to one or both fittings 76, 78 located on the transport beam (FIG. 9). In this case, the transport beam will function as a vacuum manifold, providing air suction to each of the wareholders through openings 68. In the more preferred aspects of the invention, the wareholders 50 will each be provided in the nest surface 52 with elongated opposing grooves 222, 224 (FIG. 5) which extend from the opening 68 toward each end of the wareholder. This allows vacuum to be applied to a greater surface area longitudinally of the bottle.

A most suitable application for the transport beam system, as earlier disclosed, is in operative combination with a printing station, e.g., a silk screen printer. In such a case, the transport beam 26 will be provided with two, next adjacent wareholders 226, 228 capable of vertical up and down movement a predetermined distance, as shown in FIG. 9. The vertical distance can vary some depending somewhat, among other consideration, upon the desired location of the silk-screen printing apparatus above the plane of travel of the bottles in a forward direction. Thus, the wareholder 226 need be raised vertically a distance sufficient to allow the silk screen frame 202 to pass over the article of ware 12 in usual manner and to print the design on the article, as desired. Whatever the distance that wareholder 226 moves vertically upwardly, the wareholder 228 must be capable of moving up and down the same distance, the reason for which will soon be disclosed. It is a unique advantage of this invention that the vertical up and down movement of the wareholders allows movement of the screen horizontally over a length covering several wareholders without any possible interference between the two.

The up and down movement of the wareholders 226, 228 is readily accomplished by means of the elevator mechanism 230, as shown in FIG. 9. This mechanism comprises an actuating bar 232 having the general shape of a "T" which is pivotally connected at the midpoint, referred to by reference numeral 234, of the crossbar to pivot back and forth in lengthwise fashion, as does transport beam 26. Connected to the T-bar at its midpoint is a pivot rod 236 laterally perpendicularly disposed to the transport beam, the one end of which is rotably connected to the T-bar and extends inwardly into an opening (not shown) provided in the T-bar at the mid point. The other end of the pivot rod 236 is pivotally connected, according to usual technique, to mounting means 238 (FIG. 9a) connected to the bottom member 38 of the transport beam 26. An imaginary vertical plane perpendicular to the plane defined by top member 36 will bisect the pivot rod 236 and divide the longitudinal distance between the wareholders 226, 228 in half. The T-bar, at its bottom end, is pivotally connected to a pivot bar 231 which, in turn, is pivotally connected to a standard 233 connected to the frame 108.

The wareholders 226, 228 are supported by elongated shafts 240, 242 (FIG. 9) which extend in vertical disposition perpendicular to the top and bottom members 36, 38 of the elongated transport beam and centrally disposed between side members 32, 34. As the shafts 240, 242 supporting wareholders 226, 228 are of identical construction and operation, only wareholder shaft 240 will be more fully described. The elongated shaft 240 is of tubular construction, the top end of which is connected to a fitting 58, as earlier described, for connection with a wareholder 50. The other end of shaft 240 is pivotally connected to one end of lost motion link 241, the other end of which is pivotally connected to the T-bar 230 adjacent its end, as will be appreciated by reference to FIG. 9. The bottom end of shaft 242 is pivotally connected to the cross-bar of the T-bar in like fashion (via lost motion link 243). The shaft 240 is supported for vertical up and down movement by a conventional linear bearing 244 located inside the cavity 40 and connected to the top member 36 of the transport beam. The bottom portion of the shaft 240 is supported by linear bearing 246 located in housing 248 connected to the bottom member 38 of the elongated beam. On the outer sides of the bearings 244, 246 are provided seal members 250, 252, according to known matter, whereby to maintain a sealed cavity 40. The shaft 240 is provided with an elongated opening 254, as shown in FIG. 6. A like opening (not shown) will be desirably provided in shaft 240 in diametric opposition to opening 254. Thus, when a vacuum is applied to the internal cavity 40, such will communicate with the wareholders connected to shafts 240, 242 and cause the articles being transported in such wareholders to be held securely thereto, as desired. The amount of vacuum desired in the internal cavity 40 can vary somewhat but such should not be so strong as to adversely affect the transporting of the ware. The amount of vacuum will depend somewhat on the particular ware to be transported and upon its dimensions relative to the shape of the carrier, among other things. The optimum suction that need be applied in any particular case can readily be determined and provided in the design air flow specifications of the turbine.

The ware being fed to the elongated beam can be fed, in stepwise fashion, according to various well known techniques and using apparatus known to those in the art and now conventionally used. As will be seen by reference to FIG. 1, the ware 12 is fed one piece at a time, in the desired controlled time sequence from a somewhat remotely located feed hopper 256, depicted in simple fashion in the drawing, onto one end of a horizontally disposed conveyor, generally identified by reference numeral 258. This conveyor is located perpendicular to the path of travel defined by the transport beam 26, the distal end of which is located adjacent a conventional pick and carry unit identified generally by reference numeral 260. This unit, as seen in FIG. 1, is located between the distal end of the conveyor 258 and the upstream end 42 of the elongated transport beam 26. The pick and carry unit comprises one or more conventional suction means ("suckers") 262 located at the end of shaft 264 which operates in usual fashion to pick up a piece of ware 12 and to carry and deposit such in the first wareholder 50 located on the transport beam 26 at the upstream end, when the beam is located in its rearward rest position in a horizontally disposed plane defined by the beam's planar top member 36. At that time, the transport beam 26 moves in a forward manner toward the downstream end of the system, as will be more readily seen by reference to FIG. 8 and the disclosure which follows. The ware is gripped and the beam moves rearwardly for the first wareholder to receive another piece of ware.

Other transfer units known to those skilled in the art can be used, in place of the pick and carry unit 260. The main consideration is that such a unit be capable of transferring a single article or piece of ware from a feed means containing a plurality of such articles, in timed relationship relative to the operation of the transport beam 26, and to deposit it on the first wareholder 50. Feed means other than that indicated by reference numeral 256 can also be used, if desired. For example, the feed hopper and conveyor can be replaced by a conventional gated roll ramp located opposite the upstream end of the elongated transport beam and in alignment therewith so as to deposit an article of ware directly on the first wareholder.

At the downstream end 44 of the transport beam 26, as shown in FIG. 1, there is located a pick and carry unit 266 and a horizontally disposed conveyor 268, like that earlier disclosed. Nevertheless, other means according to well-known techniques can be used, if desired. The pick and carry unit 266 picks the printed ware 12' off the last wareholder 50 (not shown) located on the transport beam. This is accomplished when the beam is in its forward rest position, later more fully disclosed. As seen in FIG. 1, the pick and carry unit 266 deposits the printed ware 12', one-at-a-time, in controlled sequence the same as the ware is fed to the transport beam 26, onto conveyor 268. The conveyor carries the ware 12' to a location where such are deposited in a collection means, such as carton 24.

Turning now to FIGS. 8 and 9, the operation of the system, generally, will be more fully described. In accordance with the invention, the articles 12 are fed stepwise one-at-a-time, in usual fashion, onto conveyor 258. Thus, the articles 12 are conveyed on the belt 258 in horizontal fashion, oriented with the neck being forward, in predetermined spaced-apart locations, the upper portion of the belt being located in approximately the same horizontal plane as that defined by the base of the wareholders located on the transport beam. The operation of the pick and carry unit 260 is triggered by suitable switch or sensor means (not shown) according to conventional techniques. Thus, one sensor can be provided to detect the presence and correct position of a bottle and a second to detect whether the leading edge is the neck or base of the bottle. The pick and carry unit 260 then transfers the plastic bottle 12 and deposits it in the first wareholder 50, at the same time turning it, if necessary, so that the neck of the bottle faces toward the front, as seen in FIG. 1. It will be appreciated, however, that the ware can be, if desired, oriented in the opposite direction. For example, the base of the ware, rather than the neck, can be detected on the conveyor. And, if desired, the base of the ware can be oriented on the wareholder so as to face the front, rather than the neck, as shown in the drawings. The orientation desired will depend somewhat upon the particular feed means used, the pick and carry unit used, if any, and the orientation of clamping means 28, 30.

When the bottle 12 is seated in the first wareholder 50, as seen in FIG. 8a, the beam 26 then is caused to move a predetermined distance in a forward direction, i.e., toward the downstream end of the beam by pivot link 103 connected to the support member 80. This link pivots in a semi-circular fashion downwardly (See FIG. 8b) describing an arcuate path. Thus, the link 103 rotates in counterclockwise fashion as seen by the arrows in FIG. 8a-b, causing the beam 26 to swing downward from the rearward rest position shown in FIG. 8a and toward the right, the link 103 stopping at the horizontal (FIGS. 8b,c). Thus, a second or forward rest position is defined by the top member 36 of the beam, this rest position lying in the same horizontal plane as the rearward position. The article of ware 12 is then clamped by the clamping means 28, 30, and then the beam reverses direction. Thus, the beam is then caused to swing downwardly from its forward rest position and toward the left, as indicated by the arrows (FIG. 8c-e), returning to the first horizontal rest position, as shown in FIG. 8e. At this point, the second article of ware in line on the conveyor belt is deposited on the first wareholder, i as seen in FIG. 8e. At the same time, the first article of ware 12 is deposited in the second wareholder and unclamped (clamping members 28, 30 move away from one another, as the support bars 128, 130 are caused to rotate in opposite directions). The beam 26 again moves downwardly and upwardly describing the arcuate path earlier mentioned, to the forward rest position. The two bottles are then clamped, and the beam reverses its direction. The third article 12 is then deposited in the first wareholder. Simultaneously, the first two articles are unclamped as they are deposited or picked up by the second and third wareholders. The beam again reciprocates in lengthwise direction, as earlier described, toward the downstream end, and on reaching the forward rest position the three articles 12 are all clamped and held, as the beam reverses its position picking u the fourth article in the first wareholder. Thus, the action continues, until the last of the articles 12 from the plurality of articles to be printed, is deposited in the first wareholder, forwarded downstream, printed and picked off the transport beam and deposited on the discharge conveyor. During the forward movement, the articles of ware are held by vacuum in the respective wareholders, such being used particularly at relatively high processing speeds.

When the first article reaches the printing zone, its forward movement is interrupted and the article is raised upwardly by the wareholder 226 such describing a smooth curve as the beam moves forwardly. This takes place subsequent to the first bottle being deposited on the wareholder 226, while such is located in its rearward rest position (FIG. 9a). As the beam 26 moves in a forward direction, the T-bar 230 is pivoted to the left and the article is raised vertically upwardly to the print zone (FIG. 9a) and clamped by conventional, well known, fixture means for clamping cylindrical objects. It will be appreciated that such clamps or fixture means are located in a horizontal plane above that defined by the other clamps and are coordinated to operate in sequence therewith. The article 12 is then printed, as the print screen 202 moves toward the left (FIG. 9A, B), and the beam 26 returns to its rearward rest position. Simultaneously, the T-bar is pivoted to the left, causing the downstream wareholder 228 to rise vertically upwardly in a smooth curve as earlier disclosed, but in reverse thereto, for pick-up of the first printed article and toward the rearward location. The wareholder 226, at the same time moves vertically downwardly until it is located in the horizontal plane defined by the rearward rest position. Thus, the second article is unclamped as it is deposited on wareholder 226. Simultaneously the first article, now printed, is unclamped as it is deposited in wareholder 228. The beam 26 then moves in forward direction again, raising the second article to the print zone to be printed and is clamped as before. As the second article is being printed, the beam returns to the rearward rest position. This action continues until the last of the articles has been printed and conveyed to the downstream end of the beam and deposited on the conveyor 268.

In the operation of the system at relatively high speeds, e.g., 60 cycles/min., it may be desirable to attach a vacuum turbine, as earlier disclosed (not shown), to the beam at fitting 78. Thus, the articles of ware 12 will be better held, during movement of the beam, in contact with the wareholder, ensuring that none of such accidentally falls off.

As set forth earlier, the system can be provided with various work stations intermediate the upstream and downstream ends. Thus, as shown in FIG. 1, the articles will initially be conveyed through a pretreatment zone to condition the surface thereof for printing, according to usual techniques. This conditioning, in general, in the case of polyethylene and polypropylene blow-molded bottles, subjects the surface to an oxidizing flame. If desired, however, other conventional surface treatments can be used, instead, depending somewhat on the material of the articles to be printed. Further, if desired, the flame spray surface treatment can be preceded by conventional surface treatment to remove dust particles from the article, sometimes ensuring better adhesion by the printing ink to the plastic bottle.

Subsequent to printing, the printed bottles will be transported through a curing zone for the wet printing ink just applied. This is accomplished, in general, by conventional UV curing means well known to those in the art. Other curing means can be used, however, depending on the nature of the ink applied. For example, a conventional flash dryer may be used for solvent based inks.

Although not disclosed, as such are not a part of the invention, the articles can be, if desired, registered on the conveyor, or in a preregistration zone preceding printing. In most instances, it will be desirable to register the orientation of the bottle prior to printing, such registration means being located in the print zone, according to usual techniques. A typical registering mechanism well known to those skilled in the art, and which can be used in the practice of this invention is disclosed in U.S. Pat. No. 3,260,194, which issued to W. M. Karlyn, and was initially assigned to the assignee of this invention. That patent also discloses a silk screen supporting frame which will be found suitable for use in this invention. The entire disclosure of that patent is incorporated herein.

It will thus be seen that the invention efficiently attains the objects set forth above, among those made apparent from the preceding description. In particular, the invention provides a relatively high production rate means for transporting an article of ware and presenting it to a printer head for printing.

It will be understood that changes may be made in the apparatus construction disclosed herein without departing from the scope of the invention. For example, other clamping or fixture means can be provided, depending somewhat upon the size and shape of the ware being transported and printed. Accordingly, it is intended that all matter contained in the above description or shown in the accompanying drawings be interpreted as illustrative rather than in a limiting sense.

Further, it should be also understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Means for transporting ware, one-piece-at-a-time, in a stepwise fashion, from one predetermined location to another comprising an elongated member of predetermined length having an upstream end and a downstream end and being disposed horizontally in a predetermined plane defined by spaced-apart upper and bottom surfaces and by vertically disposed spaced-apart side walls, said elongated member being further defined by an internal cavity extending the length thereof, an opening being provided in the bottom surface of the elongated member adjacent each said end communicating with the said internal cavity, a plurality of wareholders being provided on and connected to, in predetermined spaced-apart locations on, the said upper surface of the elongated member, an opening being provided in each of said plurality of wareholders communicating with said internal cavity, means connected to at least one of said bottom openings for providing a vacuum in the said internal cavity for holding the ware on each said respective wareholder, and means operatively connected to the said elongated member adjacent said upstream and downstream ends for reciprocally moving said elongated member in lengthwise direction in a downward direction from said horizontal plane and up again to said horizontal plane in a manner defining a semi-circular arc, and back again in the reverse direction to the original location of the beam in the said horizontal plane.

2. Means for transporting ware, one-piece-at-a-time, in a stepwise fashion, from one predetermined location to another comprising an elongated member of predetermined length having an upstream end and a downstream end and being disposed horizontally in a plane defined by an upper surface and a bottom surface, a plurality of wareholders being provided on and connected to, in predetermined spaced-apart locations, the said upper surface of the elongated member, means operatively connected to each of two preselected next adjacent wareholders of said plurality of wareholders for raising one of said two preselected wareholders a predetermined distance vertically upwardly to locate the ware carried by that wareholder in a predetermined horizontal plane above that defined by the upper surface of the elongated member while, at the same time, lowering the other of the said two preselected wareholders vertically downwardly to its initial position in the plane of the upper surface, and means operatively connected to the said elongated member adjacent said upstream and downstream ends for reciprocally moving said elongated member in lengthwise direction in a downward direction from said horizontal plane and up again to said horizontal plane in a manner defining a semi-circular arc, and back again in the reverse direction to the original location of the beam in the said horizontal plane.

3. Apparatus for the automatic transporting of each of a plurality of articles one-at-a-time in step-wise fashion one after the other to one or more work stations located in a straight line comprising:
   (a) an elongated horizontally disposed rectangular-shaped, parallelepiped member of predetermined length having an upstream end and a downstream end and being defined by vertically disposed spaced-apart, parallel planar side-members and horizontally disposed, spaced-apart, parallel top and bottom members, an upper, horizontally disposed planar surface being defined by the top member and a bottom horizontally disposed planar surface being defined by said bottom member,
   (b) a predetermined number of a plurality of wareholders being provided in predetermined spaced-apart locations on the upper surface of said elongated member and being supported thereby, each of said plurality of wareholders being defined by an elongated body member disposed laterally perpendicularly to the lengthwise direction of said elongated member, each said wareholder being of a semi-circular cross-section defining an upper supporting surface having a shape conforming t that of the article being transported for supporting said article while being transported, and a bottom surface, a connecting member extending perpendicularly and vertically downwardly from said bottom surface, and an elongated, vertically disposed connecting member being provided on and connected to, the upper surface, and an elongated, vertically disposed connecting member being provided on and connected to, the upper surface of the elongated rectangular-shaped member for engagement with the first-named connecting member and detachably connecting each said wareholder to the said rectangular-shaped, elongated member, each said wareholder being capable of holding and supporting one of said plurality of articles;
   (c) means operatively associated with each of said plurality of wareholders for gripping and holding each said article at rest; and
   (d) means operatively associated with said elongated member for moving said elongated member downwardly in reciprocal manner back and forth lengthwise a predetermined distance in an arcuate fashion.

4. Apparatus according to claim 3 wherein the said side members and top and bottom members of said elongated member each define an inner surface and such inner surfaces define an elongated internal cavity.

5. Apparatus according to claim 4 wherein openings are provided in the bottom member of the elongated member adjacent each upstream and downstream end for communicating with the said internal cavity.

6. Apparatus according to claim 5 wherein openings are provided in the top member of the elongated rectangular-shaped member and in each said wareholder and connecting members for communicating with one another and the said internal cavity.

7. Apparatus according to claim 6 wherein said apparatus further comprises means connected to said bottom openings in the said elongated rectangular-shaped member for creating a vacuum in said internal cavity and at each said openings in the plurality of wareholders for maintaining the articles on their respective wareholders during movement of the said elongated member in a forward direction. in the bottom member of the elongated member adjacent each upstream and downstream end for communicating with the said internal cavity.

8. Apparatus according to claim 4 wherein the said means associated with the elongated wareholders for gripping and holding the articles in a position of rest comprises an article bottom engaging member and an article top engaging member disposed in opposition thereto, said gripping members being capable of movement toward and away from one another for gripping and releasing the grip on an article.

9. Apparatus according to claim 8 wherein two next adjacent of the said plurality of wareholders are mounted to the said elongated member for movement vertically up and down a predetermined distance.

10. Apparatus according to claim 9 further comprising means operatively associated with said elongated member and said two adjacent wareholders for moving one such wareholder vertically upwardly while at the same time moving the other of such wareholders vertically downwardly.

11. Apparatus according to claim 10 wherein said means for causing the vertical up and down movement of the said two wareholders causes the one such wareholder to be moved vertically upwardly while the elongated member is moving in a forward direction and the other of such wareholders to move vertically upwardly while the elongated member is being reciprocated in the reverse direction.

12. Apparatus according to claim 11 wherein the one such wareholder moving vertically upwardly of the two said wareholders is located closest to the upstream end of the apparatus.

13. Apparatus for the silk screen printing of plastic containers and the like comprising, in combination:

(a) means for transporting a plurality of the said containers one-at-a-time, in step-wise fashion, longitudinally from an upstream location to a downstream location with a printing station located therebetween comprising:

(1) an elongated, horizontally disposed member of predetermined length having an upper surface and a bottom surface and defining an internal elongated cavity and having an opening in the bottom surface adjacent each end of the elongated member communicating with the said internal cavity;

(2) a plurality of elongated wareholders being provided on said upper surface in spaced-apart, predetermined locations along the length of said elongated member and extending laterally thereto, each said wareholder being connected to the said upper surface of the said elongated member, an opening being provided in each said wareholder communicating with the said internal cavity;

(3) means connected to the said bottom openings for providing suction with the internal cavity and with each opening in the said wareholders;

(4) means operatively connected to the said elongated member for moving the said elongated member from a rearward position of rest in a horizontal plane in lengthwise direction downwardly and upwardly to a forward position of rest in the same horizontal plane as the said first position of rest, and in reciprocal manner back to the first position of rest; and (5) means operatively associated with the said elongated member for gripping and holding each said plastic container at rest in a horizontal plane parallel to that in which the top surface of the elongated member is located at its positions of rest while the said elongated member travels in the rearward direction to the first position of rest;

(6) means operatively connected to two, next adjacent, preselected wareholders of the said plurality of wareholders for raising one of said two wareholders vertically upwardly a predetermined distance while lowering the other of said two wareholders vertically downwardly the same predetermined distance to its initial position; and (b) a silk screen printing apparatus being disposed above the said elongated transport member and operatively associated therewith for printing of each said plastic container while it is being gripped at its raised position.

14. Method for the transportation of a plurality of articles one-at-a-time, in a stepwise predetermined sequence from one horizontally disposed location to another comprising the following steps:

(a) feeding the first of said articles from said plurality of articles to a first predetermined location of rest in a horizontally disposed plane;

(b) clamping said article to maintain and hold such article in the said first predetermined location of rest;

(c) unclamping said article and moving such from the said first position of rest in a downward arcuate fashion and upwardly to a second position of rest in the same said horizontal plane mentioned first;

(d) clamping said article again to maintain and hold the said article in the said horizontal plane;

(e) feeding the second of said articles from the said plurality of articles to said predetermined location of rest;

(f) clamping said first article while the first and second articles are held in the same said horizontally disposed plane;

(g) unclamping said first and second articles and moving each of said articles from said horizontally disposed plane in a downward arcuate fashion and upwardly so that said second article is located in the said second position of rest and said first article is located in a third position of rest downstream from the said second position, and in the same said horizontal plane;

(h) clamping said first and second articles again to maintain the said articles in the said horizontal plane; and (i) repeating steps *a–i* for transporting the third and following said articles until the last of said plurality of articles reaches a rest position at a predetermined distance downstream from said first position of rest.

15. Method according to claim 14 wherein the transporting of each of the articles between the two locations is interrupted and each of said articles is raised, in turn, vertically upwardly in a plane perpendicular to that of the said horizontally disposed plane a predetermined distance and then each said article raised is lowered vertically downwardly in the same said vertical plane to said horizontally disposed plane, and said article is then moved downstream in stepwise fashion.

16. Method according to claim 15 wherein each of the articles is printed with a suitable design when raised to the extent of the predetermined distance and other of such articles are simultaneously being transported in a direction toward the other said location.

* * * * *

UNITED STATES PATENT AND TRADEMARK OFFICE
CERTIFICATE OF CORRECTION

PATENT NO. : 5,142,975
DATED : September 1, 1992
INVENTOR(S) : David J. Podalsky et al It is certified that error appears in the above-identified patent and that said Letters Patent is hereby corrected as shown below:

Claim 7, column 18, line 33, the word "openings" should read -opening-; same column, line 36, the subject matter following the period and beginning with the words "in the bottom member "and continuing to the end of line 38, ending with the word "cavity." should be deleted.

In claim 14, column 20, line 36, the "steps a-i" should be deleted and replaced with -steps a-h-.

Signed and Sealed this

Twentieth Day of July, 1993

Attest:

MICHAEL K. KIRK

Attesting Officer    Acting Commissioner of Patents and Trademarks